United States Patent [19]
Oshiage

[11] Patent Number: 4,702,128
[45] Date of Patent: Oct. 27, 1987

[54] RATIO CONTROL SYSTEM FOR CONTINUOUSLY VARIABLE TRANSMISSION

[75] Inventor: Katsunori Oshiage, Yokohama, Japan

[73] Assignee: Nissan Motor Co., Ltd., Yokohama City, Japan

[21] Appl. No.: 732,694

[22] Filed: May 10, 1985

[30] Foreign Application Priority Data

May 14, 1984 [JP] Japan ................................. 59-94440

[51] Int. Cl.⁴ ............................................ B60K 41/16
[52] U.S. Cl. ...................................... 74/866; 74/867; 474/28
[58] Field of Search ................. 364/424.1; 474/28, 18, 474/12; 74/865, 866, 867

[56] References Cited

U.S. PATENT DOCUMENTS

| | | | |
|---|---|---|---|
| 4,403,975 | 9/1983 | Rattunde | 474/18 |
| 4,458,318 | 7/1984 | Smit et al. | 474/28 X |
| 4,462,275 | 7/1984 | Mohl et al. | 74/866 |
| 4,510,822 | 4/1985 | Yamamuro et al. | 474/28 X |
| 4,515,040 | 5/1985 | Takeuchi et al. | 74/866 |
| 4,543,077 | 9/1985 | Yamamuro et al. | 474/12 |
| 4,565,110 | 1/1986 | Ito | 74/867 X |
| 4,576,265 | 3/1986 | Kumura et al. | 192/0.055 |

FOREIGN PATENT DOCUMENTS

| | | | |
|---|---|---|---|
| 0101151 | 2/1984 | European Pat. Off. | |
| 0140228 | 5/1985 | European Pat. Off. | |
| 3321474 | 12/1983 | Fed. Rep. of Germany | 364/424.1 |
| 57-9352 | 1/1982 | Japan | 74/867 |
| 58-39877 | 3/1983 | Japan | 74/867 |
| 58-160661 | 9/1983 | Japan | 364/424.1 |
| 58-191358 | 11/1983 | Japan | 74/865 |

*Primary Examiner*—Leslie Braun
*Attorney, Agent, or Firm*—Schwartz, Jeffery, Schwaab, Mack, Blumenthal & Evans

[57] ABSTRACT

A ratio control system for a continuously variable transmission performs a feedback control wherein an integral control gain and a proportional control gain are varied depending upon the level of a line pressure that is used to actuate a pulley unit during shifting operation.

12 Claims, 2 Drawing Figures

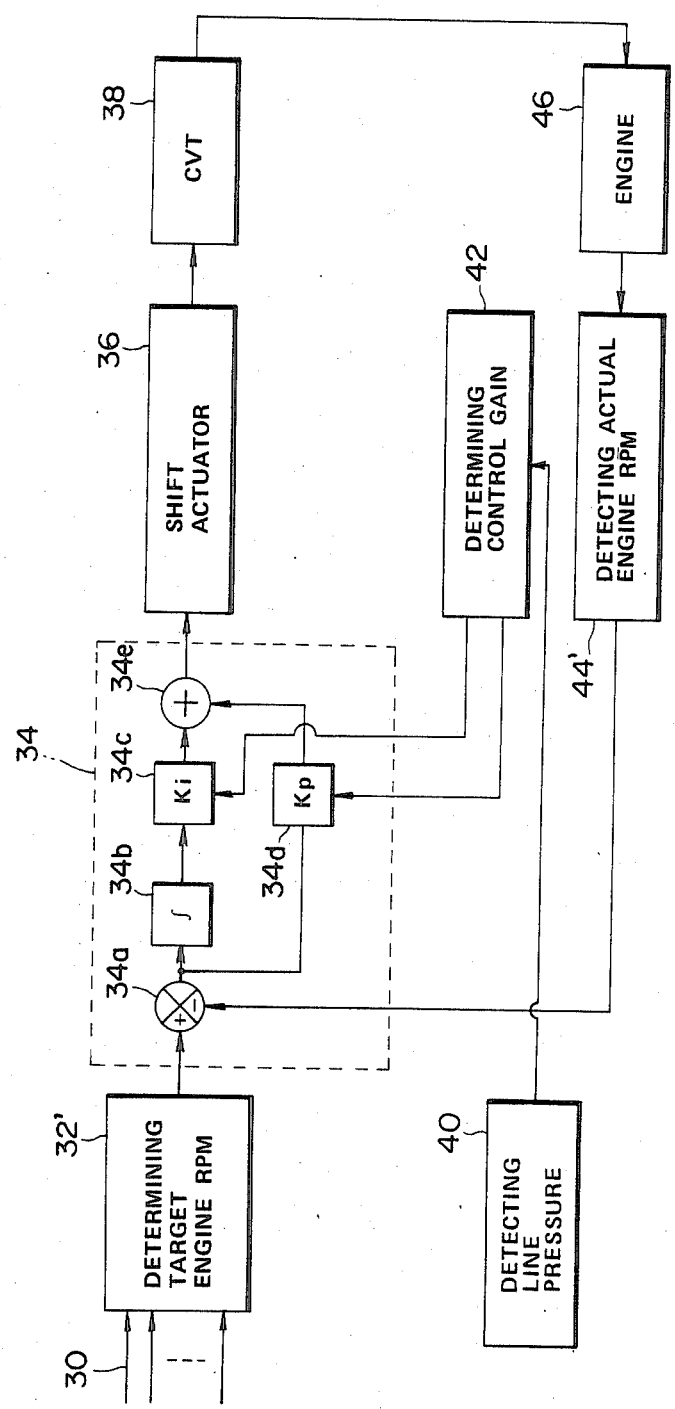

RATIO CONTROL SYSTEM FOR CONTINUOUSLY VARIABLE TRANSMISSION

REFERENCE TO RELATED APPLICATION

Reference is made to the following co-pending U.S. patent application:

U.S. Ser. No. 659,699, filed Oct. 11, 1984 (corresponding to EP No. 84112096.7, filed Oct. 9, 1984)

BACKGROUND OF THE INVENTION

The present invention relates to a ratio control system for a continuously variable transmission for example for use in automotive vehicles.

Ratio control systems for continuously variable transmissions are well known in the art. Such a ratio control system is disclosed in co-pending U.S. patent application Ser. No. 411,987, filed Aug. 26, 1982 (now U.S. Pat. No. 4,515,040) which corresponds to European Patent Application No. 82 107 823.5. In this ratio control system, a target or desired reduction ratio is determined based on various input signals representative of a variation of the vehicle's operating condition, and a pulley unit, including a drive pulley, a driven pulley and a V-belt, is hydraulically controlled such that an actual reduction ratio is varied in the proper direction to decrease the deviation from the target reduction ratio.

Generally, continuously variable transmissions include a drive pulley, a driven pulley, a V-belt drivingly interconnecting such pulleys, a source of hydraulic fluid pressure, a pressure regulator valve for regulating the hydraulic fluid pressure to develop a control pressure variable with actual reduction ratio and engine's load (induction manifold), a hydraulic a fluid network including a shift control valve establishing fluid interconnection among the regulator valve, drive pulley, and driven pulley for controlling fluid pressure supplied to the drive pulley relative to that supplied to the driven pulley so as to vary the reduction ratio in response to the position of an adjustable control member. The position of the adjustable control member is controlled by a microcomputer based control unit wherein the reduction ratio is varied such that the deviation of an actual reduction ratio from a target reduction ratio is decreased. A ratio control system of this kind is disclosed in co-pending U.S. patent application Ser. No. 543,838, filed Oct. 20, 1983, now U.S. Pat. No. 4,576,265 (corresponding to EP No. 83 110 546.5).

In a ratio control system of the above kind, the deviation from the target reduction ratio is integrated and then mulitplied with a predetermined constant (integral gain) to provide an integral control factor, and the deviation is multiplied with another predetermined constant (proportional gain) to provide a proportional control factor. The integral and proportional control factors are added to each other and based on this result, a control unit generates a shift command signal to a shift actuator, such as a stepper motor, for adjusting the position of an adjustable control member. The integral and proportional control gains are set to constants, respectively. Since shifting response is proportional to the line pressure such that it is slow when the line pressure is low, while it is fast when the line pressure is high, the ratio control system cannot provide shifting response to satisfy drivability and stability criteria over varying level of the line pressure if the integral and proportional control gains are kept unchanged with variations of the line pressure. In other words, if the control gains are set to optimum constants in view of a certain level of the line pressure, the control system provides slower shifting response than required when the line pressure is lower than this level or faster shifting response than required when the line pressure is higher than this level. Therefore, the conventional ratio control system fails to accomplish a desired operating condition, for example, operating condition where the fuel consumption is minimum, over varying level of line pressure.

SUMMARY OF THE INVENTION

An object of the present invention is to provide a ratio control system, free from the above problem, which provides shifting response well matched wtih varying level of line pressure.

According to the present invention, there is provided a ratio control system for a continuously variable transmission drivingly connected to an engine, wherein shifting response is variable with the level of a predetermined hydraulic fluid pressure, comprises:

means for detecting the level of the predetermined hydraulic fluid pressure and generating a hydraulic pressure level indicative signal;

means responsive to said hydraulic fluid pressure level indicative signal for determining a control gain and generating a control gain indicative signal; and means for effecting a feedback control in response to said control gain indicative signal.

BRIEF DESCRIPTION OF THE DRAWINGS

FIG. 2 is a similar view to FIG. 1 showing a second embodiment.

DESCRIPTION OF THE EMBODIMENTS

Figure 1:
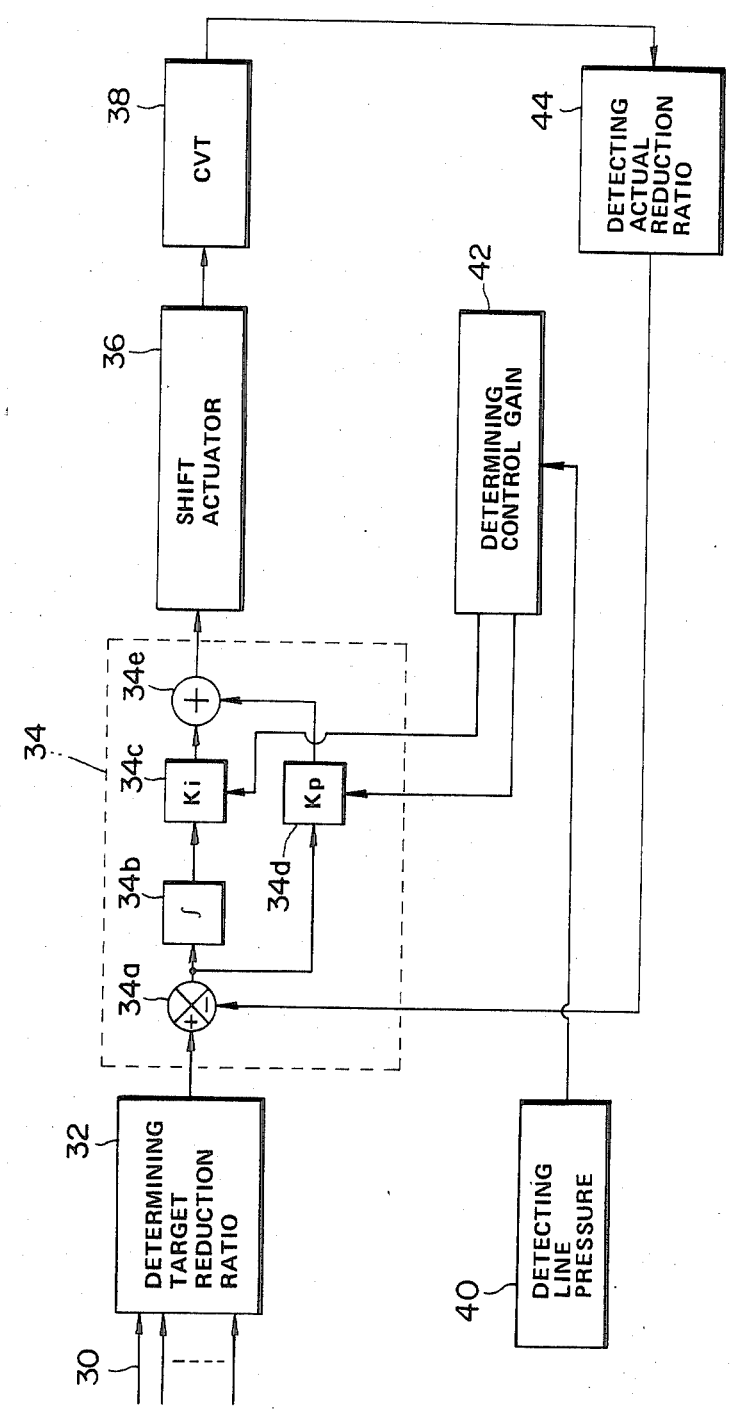
FIG. 1 is a schematic control block diagram showing a first embodiment.

Hereinafter, embodiments according to the present are described in connection with FIGS. 1 and 2.

(First Embodiment)

Referring to the first embodiment shown in FIG. 1, various signals 30 representative of varying vehicle's running condition are fed to a target reduction ratio determination unit 32 which determines a target reduction ratio for the input signals. The target reduction ratio is determined in accordance with a predetermined shift pattern which is designed to cause an engine to operate always with the minimum fuel consumption rate when the reduction ratio of a continuously variable transmission 38 is controlled in accordance with the predetermined shift pattern. The signal indicative of the target reduction ratio given by the target reduction ratio determination unit 32 is fed to the feedback control unit 34 which provides a shift actuator 36 with a shift command signal so as to urge the continuously variable transmission 38 to shift to the target reduction ratio. The shift actuator 36 is controlled in response to the shift command signal and adjusts the reduction ratio of the continuously variable transmission 38 in response to the operating position of the actuator 36. The actual reduction ratio of the continuously variable transmission 38 is detected by an actual reduction ratio detector 44 and it is fed to the feedback control unit 34. Line pressure of a hydraulic control system for shifting the continuously variable transmission 38 is detected by a line pressure detector 40 which generates an electric signal indicative of the level of the line pressure. This signal is fed to a control gain determination unit 42. Since it is proportional to the actual reduction ratio, the line pressure may be detected by detecting the actual reduction ratio. Therefore, the actual reduction ratio may be provided by detecting the position of a shift control valve or the position of a pulley. The gain determination unit 42 determines the control gain in response to the signal from the line pressure detector 40 in the manner described later and feeds the control gain to the feedback control unit 34. The control gain determination unit 42 determines an integral control gain Ki and a proportional control gain Kp based on the signal indicative of the line pressure in the following manner. The control gains Ki and Kp are provided by calculating the following equations:

$$Ki = Ci - P_L$$

$$Kp = Cp - P_L$$

where, $P_L$ = signal corresponding to line pressure,

Ci = constant, and

Cp = constant.

Thus, the control gains Ki and Kp are inversely proportional to the level of the line pressure. The integral control gain Ki and proportional control gain Kp determined by the above equation are fed to the feedback control unit 34. The feedback control unit 34 operates in a manner which is hereinafter described. In the feedback control unit 34, the deviation of an actual reduction ratio, detected by an actual reduction ratio detector 44, from the target reduction ratio, determined by the target reduction ratio determination unit 32, is determined at an arithmetic unit 34a. This deviation is integrated by an integrator 34b and then multiplied, at a multiplier 34c, with the integral control gain Ki so as to give an integral control factor. On the other hand, the deviation determined at the arithmeric operation unit 34a is multiplied, at a multiplier 34d, with the proportional control gain Kp so as to give a proportional control factor. The integral and proportional control factors are added to each other at an adder 34e which, in turn, outputs the result to a shift actuator 36. Accordingly, the overall control gain decreases to compensate for a gain in shifting response which would be caused by an increase in the line pressure, while on the other hand, the overall response which would be caused by a drop in the line pressure. As a result, the control system provides a shifting response matched well with varying level of the line pressure.

(Second Embodiment)

FIG. 2 shows the second embodiment according to the present invention. In this embodiment, the present invention is applied to a feedback control system wherein a target engine revolution speed determined by a target engine revolution speed determination unit 32' and an actual engine revolution speed of an engine 46 detected by an engine revolution speed detector 44' are fed to feedback control unit 34 where the actual engine speed is brought into agreement with the target engine speed. This embodiment is different from the first embodiment only in that what is controlled is the engine speed. This and effect to those of the first embodiment.

In each of the above mentioned embodiments, the control gains which are inversely proportional to the line pressure are determined by the control gain determination unit 42. Alternatively, in the case a microcomputer is used, the optimum values in the integral and proportional control gains are given as a table for each level of line pressure and this table is retrieved to give optimum control gains for the line pressure. Although, in the above two embodiments, the line pressure is detected by the line pressure detector 40, since the line pressure is variable in response to throttle opening degree and reduction ratio, a signal indicative of the level of the line pressure can be determined by arithmetic operation based on signals indicative of the throttle opening degree and the reduction ratio. Instead of effecting feedback control of the reduction ratio as in the first embodiment, the operating position of a shift actuator may be controlled in feedback manner because the operating position is closely associated with the reduction ratio.

I claim:

1. A ratio control system for a continuously variable transmission having a hydraulic shifting mechanism which produces a change in transmission reduction ratio responsive to a change in line hydraulic fluid pressure which varies with reduction ratio, comprising:

means for generating a line hydraulic pressure level indicative signal which indicates the level of line hydraulic fluid pressure and varies with the level of line hydraulic fluid pressure;

means responsive to said line hydraulic fluid pressure level indicative signal for determining a control gain which varies with said line hydraulic fluid pressure level indicative signal and generating a control gain indicative signal indicating the determined control gain; and feedback control means for producing a control factor responsive to said control gain indicative signal and a ratio change command, wherein said hydraulic shifting mechanism is controlled in response to said control factor.

2. A ratio control system as claimed in claim 1, including means for producing said ratio change command based on a deviation of an actual reduction ratio from a target reduction ratio.

3. A ratio control device as claimed in claim 1, including means for producing said ratio change command based on a deviation of an actual engine revolution speed of the engine from a target engine revolution speed.

4. A ratio control system as claimed in claim 1, wherein said line pressure level indicative signal generating means detects the level of the line hydraulic fluid pressure so as to generate said line pressure level indicative signal.

5. A ratio control system as claimed in claim 1, wherein said line pressure level indicative signal generating means determines the level of the line hydraulic fluid pressure by an arithmetic operation based on a signal indicative of the reduction ratio so as to generate said line pressure level indicative signal.

6. A ratio control system as claimed in claim 1, wherein said line pressure level indicative signal generating means determines the level of the line hydraulic fluid pressure by an arithmetic operation based on signals indicative of the reduction ratio and the engine throttle opening degree so as to generate said line pressure level indicative signal.

7. A ratio control system for a continuously variable transmission drivingly connected to an engine, wherein the transmission is hydraulically shiftable in reduction ratio utilizing a line hydraulic fluid pressure, comprising:
- means for detecting the level of the line hydraulic fluid pressure and generating a line pressure level indicative signal variable with the level of the line hydraulic fluid pressure detected;
- means responsive to said line pressure level indicative signal for determining a control gain and generating a control gain indicative signal indicative of said control gain determined; and
- feedback control means for producing a control factor responsive to said control gain indicative signal and a ratio change command, wherein the hydraulically shiftable transmission is controlled in response to said control factor.

8. A ratio control method for a continuously variable transmission drivingly connected to an engine, wherein the transmission is hydraulically shiftable in reduction ratio utilizing a line hydraulic fluid pressure that is variable with a reduction ratio, comprising the steps of:
- generating a line pressure level indicative signal variable with the level of the line hydraulic fluid pressure;
- determining, responsive to said line pressure level indicative signal, a control gain variable with said line pressure level indicative signal and generating a control gain indicative signal indicative of said control gain determined;
- determining a ratio change command and generating a ratio change command indicative signal; and
- effecting a feedback control to produce a control factor responsive to said control gain indicative signal and said ratio change command indicative signal.

9. A control method as claimed in claim 8, wherein said line pressure level indicative signal generating step includes a step of detecting the level of the line hydraulic fluid pressure so as to generate said line pressure level indicative signal.

10. A ratio control method as claimed in claim 9, wherein said line pressure level indicative signal generating step includes a step of determining the level of the line hydraulic fluid pressure by an arithmetic operation based on a signal indicative of the reduction ratio so as to generate said line pressure level indicative signal.

11. A ratio control method as claimed in claim 8, wherein said line pressure level indicative signal generating step includes a step of determining the level of the line hydraulic fluid pressure by arithmetic operation based on signals indicative of the reduction ratio and the engine throttle opening degree.

12. A feedback control system for controlling a reduction ratio in a continuously variable transmission drivingly connected to an engine, wherein the transmission is hydraulically shiftable in reduction ratio utilizing a line hydraulic fluid pressure, the feedback control system effecting a feedback control based on a deviation of an actual reduction ratio indicative signal from a desired reduction ratio indicative signal with a proportional control gain and an integral control gain, a method comprising the steps of:
- determining the level of the line hydraulic fluid pressure and generating a line pressure level indicative signal variable with the level of the line hydraulic pressure determined;
- varying the proportional and integral control gains with said line pressure level indicative signal; and
- determining a control factor responsive to said deviation and said integral and proportional control gains.

* * * * *